United States Patent [19]

Marmer et al.

[11] Patent Number: 5,653,457
[45] Date of Patent: Aug. 5, 1997

[54] CONVERTIBLE TABLE/CART APPARATUS

[75] Inventors: Keith S. Marmer, Medford, N.J.; Glenda L. Key, Minneapolis; Richard Brown, Eagan, both of Minn.

[73] Assignee: Key Functional Assessments, Inc., Minneapolis, Minn.

[21] Appl. No.: 315,823

[22] Filed: Sep. 30, 1994

[51] Int. Cl.[6] .................................................. B62B 3/04
[52] U.S. Cl. ...................... 280/30; 280/47.35; 280/79.11
[58] Field of Search .......................... 280/30, 32.5, 32.6, 280/47.16, 47.17, 47.18, 47.2, 47.34, 47.35, 47.36, 47.371, 47.41, 79.11, 79.3; 108/11, 12, 18, 19, 144

[56] References Cited

U.S. PATENT DOCUMENTS

| | | | |
|---|---|---|---|
| 1,429,926 | 9/1922 | Carre | 280/30 |
| 2,583,811 | 1/1952 | Boyes et al. | 108/1 |
| 2,604,334 | 7/1952 | Schultz | 280/47.35 |
| 2,611,417 | 9/1952 | Henry et al. | 280/30 |
| 2,633,363 | 3/1953 | Marshall | 280/47.18 |
| 2,730,372 | 1/1956 | Mahr | 280/30 |
| 2,774,609 | 12/1956 | Winger | 280/79.11 |
| 2,846,233 | 8/1958 | Burg | 280/30 |
| 2,862,720 | 12/1958 | Stone et al. | 280/33.998 |
| 3,329,105 | 7/1967 | McPherson | 180/144 |
| 3,689,098 | 9/1972 | Rubin | 280/79.11 |
| 4,565,382 | 1/1986 | Sherman | 280/47.18 |
| 5,092,615 | 3/1992 | Gregalis | 280/30 |
| 5,201,536 | 4/1993 | Bono et al. | 280/30 |
| 5,257,892 | 11/1993 | Branch | 280/47.18 |

FOREIGN PATENT DOCUMENTS

| | | | |
|---|---|---|---|
| 2596718 | 10/1987 | France | 280/79.11 |
| 1300468 | 7/1969 | Germany | 180/12 |
| 31 23 440 | 7/1983 | Germany | 280/47.18 |

*Primary Examiner*—Richard M. Camby
*Assistant Examiner*—Frank Vanaman
*Attorney, Agent, or Firm*—Merchant, Gould Smith, Edell Welter & Schmidt P.A.

[57] ABSTRACT

A convertible table/cart which includes a plurality of wheels positioned underneath a planar surface. A plurality of legs/sides may be positioned either underneath the surface for use as a table or on top of the surface for use as a cart. Also disclosed is a method of converting the table to the cart.

9 Claims, 3 Drawing Sheets

CONVERTIBLE TABLE/CART APPARATUS

FIELD OF THE INVENTION

The present invention relates to a convertible table/cart.

BACKGROUND OF THE INVENTION

A number of convertible tables are known in the art. These include tables which convert into a carrying case or a two wheel dolly. Other tables may include wheels mounted within the table surface so that they can be flipped over and used as a cart. Still other tables, such as banquet tables, include wheels so that many of the them can be stacked one on top of another for easily transporting the tables. A need exists for a convertible table/cart which has features not found in these convertible tables. In particular, a need exists for a sturdy and durable apparatus which quickly and easily converts between a table and a cart.

SUMMARY OF THE INVENTION

The present invention is a convertible table/cart and a method of converting it between a table and a cart. The convertible table/cart includes wheels positioned beneath the table surface. It further includes legs for the table which may be repositioned on top of or approximate the table surface to be used as handles or sides for the cart.

DETAILED DESCRIPTION OF THE PREFERRED EMBODIMENTS

Figure 1:
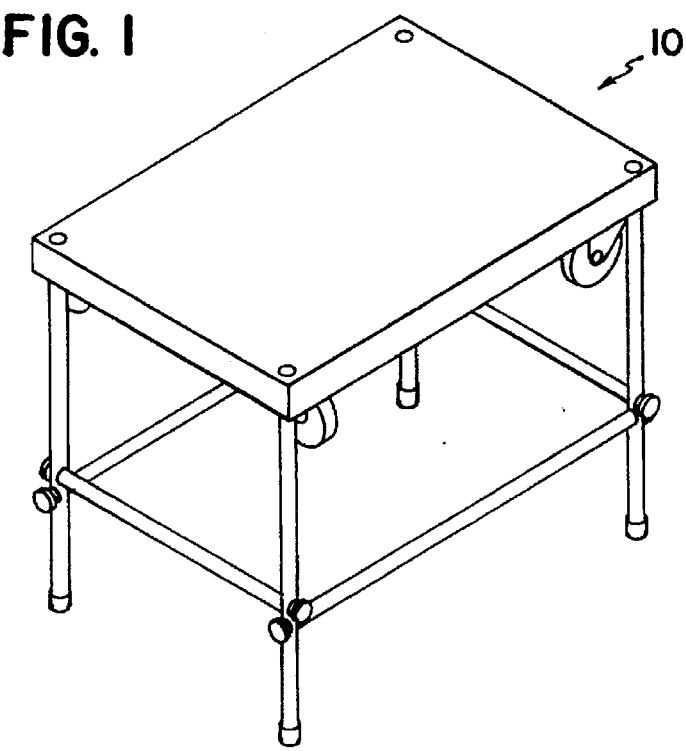
FIG. 1 is a view of the apparatus assembled as a table.
Figure 2:
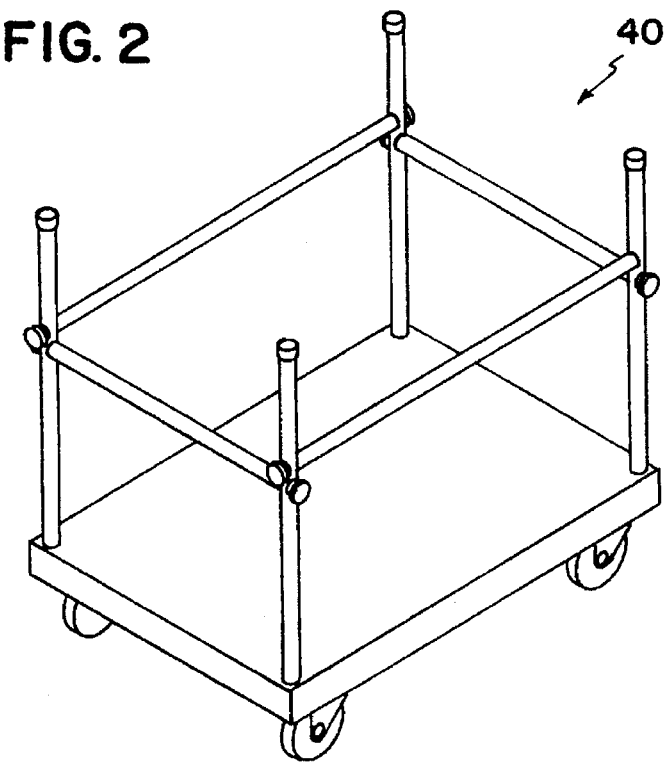
FIG. 2 is a view of the apparatus assembled as a cart.

The present invention provides for a sturdy and durable apparatus which may be easily converted between a table and a cart. FIG. 1 is an assembled view of the apparatus in a table embodiment 10. FIG. 2 is a view of the apparatus assembled in a cart embodiment 40.

Figure 3:
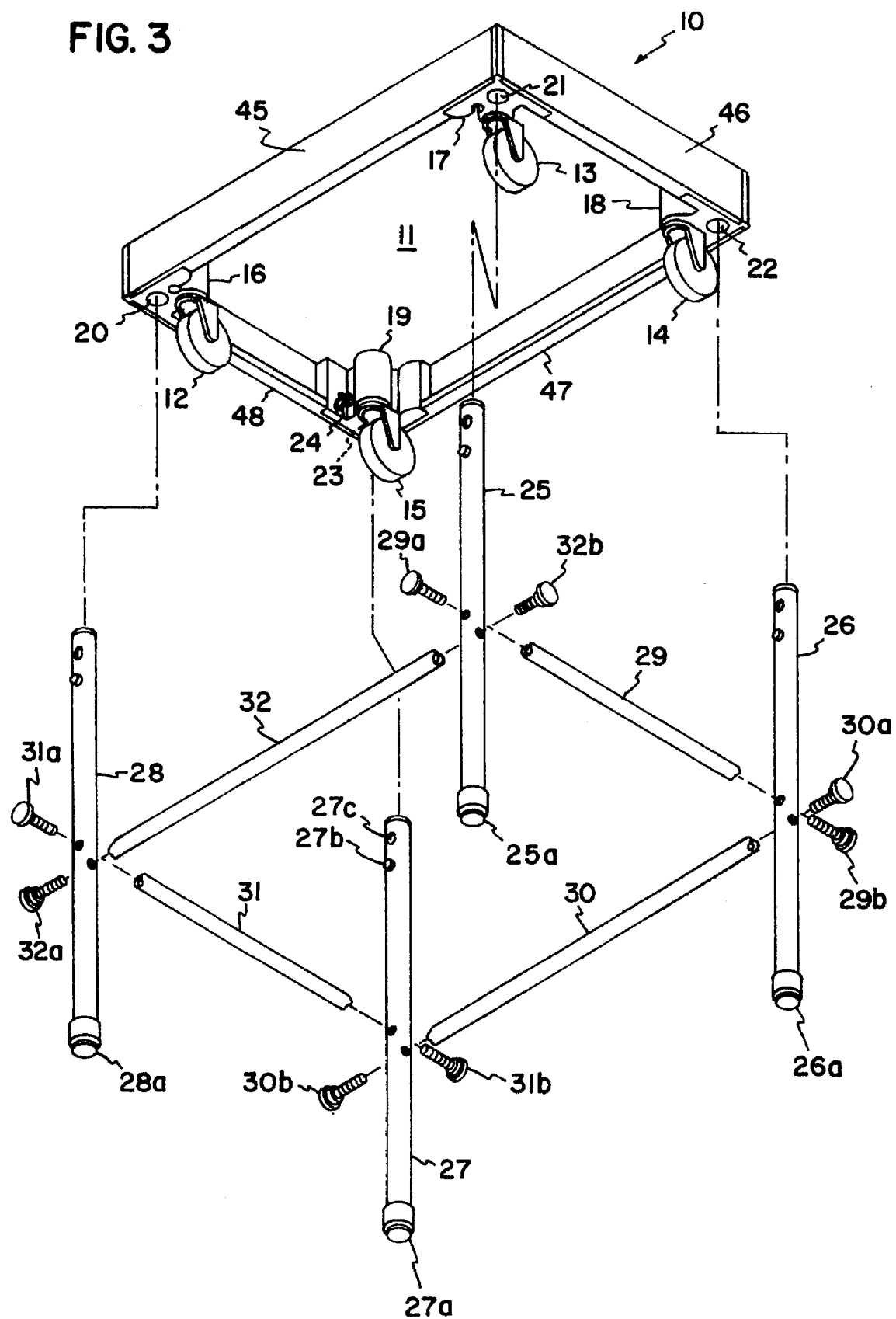
FIG. 3 is an exploded view of the table embodiment of the apparatus.

FIG. 3 shows more detail and an exploded view of the table embodiment 10. The apparatus for the table 10 includes a surface 11, the bottom side of which is shown in FIG. 3. Attached to surface 11 are four sides 45–48. The surface 11 and sides 45–48 are preferably comprised of aluminum to reduce weight. Within each of the corners of surface 11 are corner blocks 16–19. Preferably, each of the blocks includes one of the corresponding wheels 12–15. The blocks 15–19 also include apertures 20–23. Each of the blocks 16–19 are preferably comprised of an extruded aluminum block for ease of assembly and manufacture and to reduce weight.

A plurality of support members 25–28 fit within the corresponding apertures 20–23 to form legs for the table embodiment 10. The support members 25–28 are also preferably comprised of round aluminum tubing to reduce weight. Each of the support members preferably includes a permanent projecting pin, such as pin 27b on support member 27. The pin 27b protrudes slightly from the support member 27. When the support member 27 is placed within the aperture 23, the pin 27b is pressed against the bottom of the block 19 and holds the support member 27 in place for the table 10 by allowing only a portion of the support member 27 to fit within the aperture 23.

Each of the blocks typically includes a retractable pin, such as pin 24 shown on block 19, for locking the support members 25–28 into place. The pin 24 is typically a spring loaded pin which may be held in a first (retracted) position by pulling out and turning one-quarter turn. When in a second (locked) position, the spring forces the pin 24 into and through a corresponding aperture of one of the support members 25–28, such as aperture 27c for locking support member 27 in the table embodiment 10.

The support members 25–28 are preferably further supported by cross support members 29–32. Cross support member 29 holds together support members 25 and 26 via screws 29a and 29b. Cross support member 30 holds together support members 26 and 27 via screws 30a and 30b. Cross support member 31 holds together support members 27 and 28 via screws 31a and 31b. Cross support member 32 holds together members 25 and 28 via screws 32a and 32b. The cross-support members 29–32 are also preferably comprised of aluminum to reduce weight.

The support members 25–28 also may include corresponding end caps 25a–28a.

Figure 4:
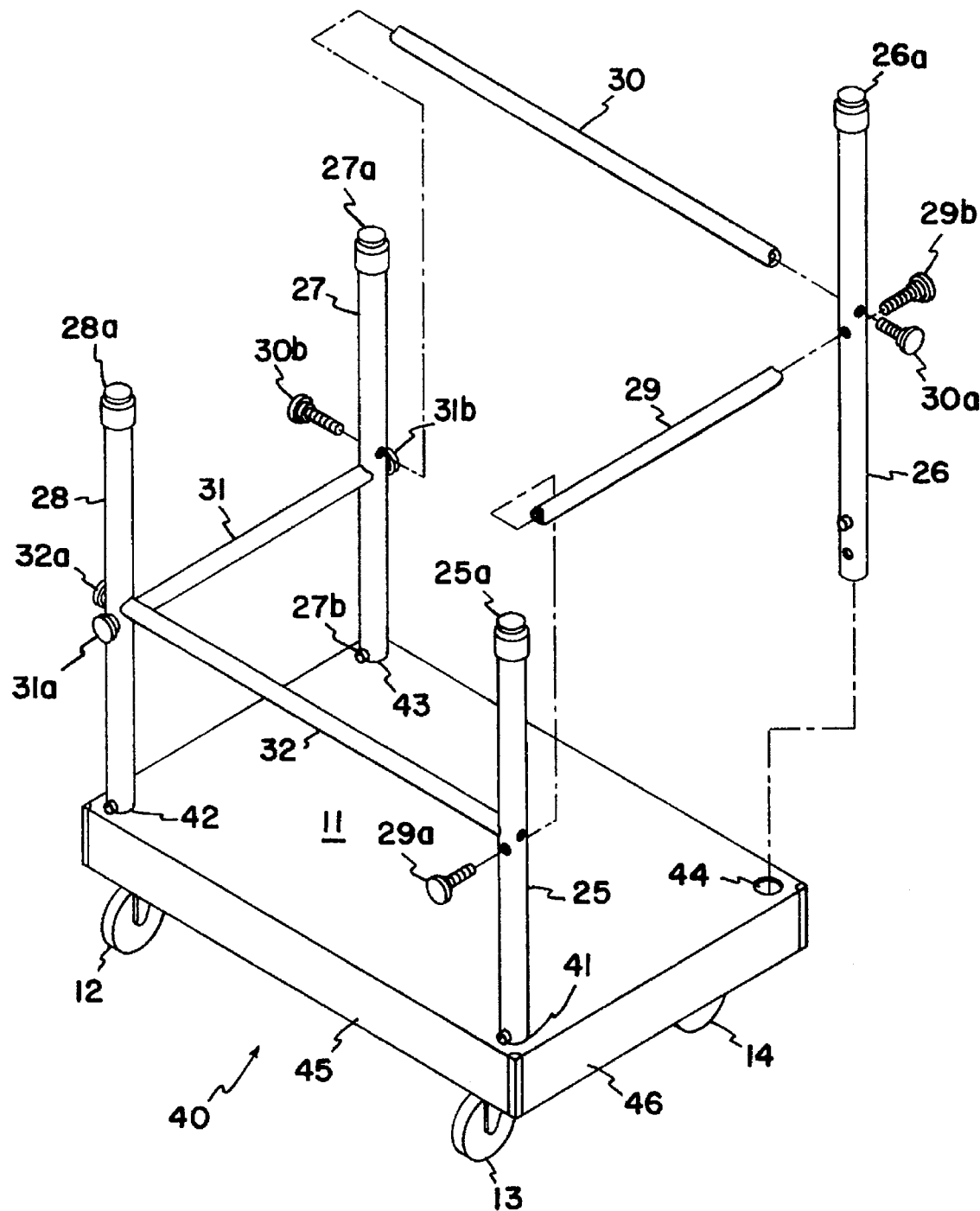
FIG. 4 is a partially exploded view of the cart embodiment of the apparatus.

FIG. 4 shows the apparatus in a cart embodiment 40. In this figure, the top side of surface 11 is shown. In the cart embodiment 40, the support members 25–28 may be repositioned on top of surface 11 into apertures 41–44 of the surface 11 in order to form sides or handles. The wheels 12–15 are in rolling engagement with the ground or other surface to facilitate easy movement of the cart. The wheels 12–15 are preferably of the type that are rotatable 360° on an axis perpendicular to an axis of rotation of the wheels, such as well known caster wheels.

The apertures 41–44 in the surface 11 preferably line up with the apertures 20–23 in the corner blocks 16– 19. Therefore, the support members 25–28 may fit through the apertures 41–44 of the surface and into the apertures 20–23 of the corner blocks 16–19. The support members 25–28 are preferably held in place by permanent pins, such as the pin 27b which protrudes slightly from the support member 27 and is pressed against the top of the surface 11 when the support member 27 is in place for the cart 40. The pin 27b thus allows only a portion of the support member 27 to fit within the apertures 23 and 43.

In addition, the support members 25–28 are preferably locked into place via a retractable pin within each of the corner blocks 16–19, such as the spring loaded pin 24. In the cart embodiment 40, each of these springs typically operates in the same manner as in the table embodiment, as explained above. For example, pin 24 fits within aperture 27c for locking support member 27 in the cart embodiment 40 (see FIG. 3). The cross support members 29–32 also may be attached to the support members 25–28 in the cart embodiment 40 in the same manner as for the table embodiment 10. The cross-support members 29–32 thus increase the stability of the support members 25–28 and provide sides for the cart 40.

While the preferred cart 40 includes four wheels, it is to be appreciated that more or fewer wheels could be used; for example, a three wheeled cart may be provided, if desired. Also, only two wheels may be provided, if a tippable two wheel dolly arrangement is desired.

In the preferred table 10/cart 40, support members 25–28, and cross-support members 29–32 are detachable from one another. However, a permanent mounting of the support members and cross-support members is an option, if desired.

In addition, although the preferred table 10/cart 40 shows the support members 25–28 fitting within corner blocks, these support members could also be side mounted such as on or within sides 45–48, if desired. Also, while the preferred support members 25–28 are shown as straight tubing, one could use other shapes, such as square tubing, and could also bend the tubing, such as angling it outward near the ends.

While the present invention has been described in connection with the preferred embodiment thereof, it will be understood that many modifications will be readily apparent to those skilled in the art, and this application is intended to cover any adaptations or variations thereof. It is manifestly intended that this invention be limited only by the claims and equivalents thereof.

What is claimed is:

1. A convertible table/cart apparatus, comprising:

a substantially planar support surface having a top and a bottom;

four wheels mounted proximate the support surface and extending away from the bottom of the support surface;

a plurality of repositionable vertical support members, the support members being selectively mounted in a first position proximate the support surface and extending away from the bottom of the support surface such that the apparatus comprises a table, and being further selectively mounted in a second position proximate the support surface and extending away from the top of the support surface such that the apparatus comprises a cart, each support member having a distal end and a proximate end, the distal end of each support member mounted adjacent to the support surface in the first position and in the second position, the proximate end of each support member spaced from the support surface in the first position and in the second position, wherein the plurality of support members comprise first and second pairs of vertical legs;

a first cross-support member having opposite ends detachably connected to each leg of the first pair of legs; and a second cross-support member having opposite ends detachably connected to each leg of the second pair of legs, wherein the first and second cross-support members are located below the support surface when the apparatus is a table, and wherein the first and second cross-support members are located above the support surface when the apparatus is a cart.

2. The apparatus of claim 1, wherein the support surface is rectangular and wherein the wheels are mounted to the bottom of the support surface, one wheel in each corner of the rectangle of the support surface.

3. The apparatus of claim 2 wherein the wheels are rotatable 360° on an axis perpendicular to an axis of rotation of the wheels.

4. The apparatus of claim 1, further comprising:

a third cross-support member detachably connected to one leg of each of the first and the second pairs of legs; and a fourth cross-support member detachably connected to the other leg of each of the first and the second pairs of legs and located opposite the third cross-support member, wherein the third and fourth cross-support members are located below the support surface when the apparatus is a table, and wherein the third and fourth cross-support members are located above the support surface when the apparatus is a cart.

5. The apparatus of claim 4 wherein the first and the second pairs of legs and the first, the second, the third, and the fourth cross-support members are each comprised of round aluminum tubing.

6. The apparatus of claim 1 wherein:

the support members are selectively mounted in the first and the second positions by an attachment unit which comprises a plurality of blocks mounted to the bottom of the support surface, each of the blocks defining a first aperture for locating the distal ends of the support members in the first position and defining a second aperture for locating the distal ends of the support members in the second position, the first and second apertures of each block being co-axially aligned; and each of the support members includes a permanent pin which protrudes from the support member and defines an amount of the support member which fits within the first and second apertures.

7. The apparatus of claim 6 wherein each of the plurality of blocks includes a spring loaded pin slidable between a first position in which the pin is retracted and a second position in which the pin fits through a corresponding aperture in one of the support members, the pin lockable in the first position.

8. The apparatus of claim 6 wherein each of the wheels is mounted in one of the blocks.

9. The apparatus of claim 6 wherein each of the blocks is comprised of aluminum.

* * * * *